United States Patent Office 3,408,276
Patented Oct. 29, 1968

3,408,276
METHOD FOR PREPARING AND CONSERVING FREE RADICALS
Louis Rey, Vaud, Switzerland, assignor to L'Air Liquide
Filed May 5, 1965, Ser. No. 453,449
Claims priority, application France, May 11, 1964, 974,007
7 Claims. (Cl. 204—157.1)

ABSTRACT OF THE DISCLOSURE

Free radicals are formed by freezing a free radicals-generating substance diluted in a liquid medium and irradiating, therefore the frozen liquid medium is separated out by selective sublimation at a low temperature to provide a residual porous mass containing the free radicals, and allowably raising the temperature to ambient temperatures with the exclusion of air.

---

Figure 1:
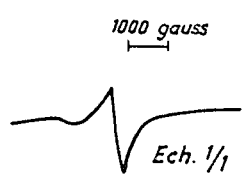

The invention relates to a method for preparing free radicals and preserving them in stable form.

It has been known for some time that the majority of chemical reactions is affected by active atomic groupings generally of transitional character, or free radicals. In the isolated state these have a very high chemical reactivity and therefore also a high degree of instability. Owing to their particular structure, however, they may be detected and their concentration can be measured by various methods (absorption spectrum in the visible, near ultra violet, far ultraviolet, and infrared ranges, mass spectrometry, X-ray diffraction at low temperature, low temperature emission spectra, measurement of the dielectric constant, of the magnetic susceptibility, of thermal conductivity, of the index of refraction, calorimetric measurements, and especially measurements of the paramagnetic electronic resonance, owing to their non-symmetrical electronic structure).

These free radicals are of great interest as initiators of chemical reactions in industrial chemistry, for propulsion, metallurgy and for the study of protection against radiation.

There are several methods known for preparing free radicals: the fast isolation of intermediaries being formed in a chemical reaction, or dissociation of complex molecules by various physical processes (heat, irradiation, high frequency excitation, etc.); in the latter case, normally balanced systems can be activated and can contain large amounts of free radicals.

The study of these can be effected in two different ways:

(a) either by studying the formed radicals in their initial condition which requires that they should be capable of being preserved in the stable state for a sufficiently long time;

(b) or by studying indirectly through observing their reaction processes, that is to say, by analyzing their conditions of recombining.

In the first case, one tries substantially to prevent any recombination of the formed radicals and to this end they must be blocked in stable states. To this end, different methods are generally used:

The radicals can be dispersed in a solid inert matrix so that the reactive centers are separated and prevented from making contact with one another. In this way, radicals are blocked in glasses or in crystalline lattices.

The radicals are immobilized by adsorption on active surfaces in predetermined positions from which they can be extracted only at great difficulty. In this way, several investigators have effected the fixing of radicals formed in the gaseous phase by circulating the fluid for example across a net of polystyrene with a large surface.

The radicals are blocked by direct thermal blocking or inside inert condensed matrices. In this way, one obtains by condensation of a gas on very cold walls or by activation effected at very low temperature what is generally called "frozen radicals." Naturally in this case, the maintenance of the very low temperature is essential for the permanent durability of the radicals. When the system is heated the radicals recover their mobility and can emigrate to the interior of the base where they invariably recombine. This method is widely used and permits remarkable research to be carried out with highly active free radicals, such as H, $NH_2$, OH immobilized in an argon lattice or in a lattice of solid hydrogen at very low temperatures achieved with liquid or solid hydrogen or helium.

The second method for studying free radicals consists in following up the modalities of their recombination. This makes it possible to assess their mobility and their affinities under specific conditions and to draw interesting conclusions relating to their reactivity and their structure. The reaction can be almost instantaneous, for example, where an active gas makes contact with a reactive solid, or may have a progressive character for example, when a solid irradiated at low temperature is slowly heated. The reactive processes can become apparent either by the thermal effects, ranging from simple warming up to violent explosion (H–CHO . . .) with the formation of specific chemical species (often polymers) or by changes in the color ($HN_3$, $NH_4$, etc.) or properties of the spectrum (NH, $NH_2$, OH, $C_6H_5$—$CH_2$, $CH_3CHOH$, etc.).

They can also result in photochemical phenomena with luminescent emission. Thus, in the thermo-luminescent method one can observe successive deactivations which indicate particular combinations and become apparent as a series of characteristic luminous emissions according to the degree of reheating of an originally "frozen" system.

However, the problem of preserving free radicals in sufficient quantities in the stable state and adapted to serve as reacting mass for a predetermined purpose could not yet be solved satisfactorily since their maintenance in the frozen state at very low temperature requires the maintenance of a large set-up under cold conditions and entails great difficulties in the manipulation.

The present invention has the object of removing these drawbacks and of permitting the preservation of free radicals in sufficient quantities over long periods without requiring special measures to maintain them in the cold state and wherein they are kept stable and adapted to be used immediately for the required purpose.

According to the invention, this object is realized by a process comprising the steps of preparing the free radicals by a treatment, as known in the art, of a substance generating free radicals, diluted in a liquid solidified at low temperature, of eliminating the diluent by selective sublimation at low temperature, wherein the temperatures during the preparation and during the selective sublimation of the diluent are held sufficiently low to avoid the spontaneous recombination of the free radicals, and of allowing the temperature of the residual porous mass containing the free radicals to rise to near the ambient temperature under exclusion of air.

It also comprises preferably the following embodiments either individually or in combination:

(a) The selective sublimation is carried out on a sufficiently thick layer of the diluted frozen liquid containing the material enriched in free radicals to enable the peripheral porous zone formed during the selective sublimation to retain selectively the free radicals which could sublimate from the compact inner zone;

(b) After the treatment of a free radical generator forming different kinds of free radicals, a reheating is effected from the frozen state up to a temperature at which only the type of radical to be preserved remains stable;

(c) The controlled reheating makes it possible to preserve only the type of free radical desired and is carried out prior to the selective sublimation of the diluent;

(d) The controlled reheating is effected during the selective sublimation of the diluent;

(e) A final stabilization of the free radicals is effected by impregnating the residual porous mass containing the free radicals by an inert matrix cast in the liquid state and then hardened.

The method of the invention comprises therefore submitting the substance containing the free radicals to a technique similar to that of lyophilisation used in practice for preserving biological and pharmaceutical products.

The preliminary system, preferably liquid, from which the free radicals are to be prepared, is first frozen and solidified at a very low temperature in order to impart to it the required rigidity. It is then activated by means of a conventional method, for example, by irradiation. Under the application of energy the molecules dissociate and if the radiolytic output is good numerous free radicals are formed.

Finally, the excited system is reheated under controlled conditions, without, however, exceeding the temperature at which a spontaneous deactivation by radical migration can occur, and then the system is dried, This works through lyophilisation that is to say, substantially by the sublimation of the molecules of the frozen solvent or solvents, wherein the cryodesiccation is effected preferably under a high vacuum.

In this manner, a forced desiccation at low temperature is realized until there results a finely porous structure which no longer contains any trace of liquid. This system which now contains a substantial concentration of perfectly stable free radicals may be reheated gradually to ambient temperature where it is preserved either under vacuum or in a protective atmosphere of an inert and dry gas (nitrogen, argon, etc.).

The free radicals are stabilized by two phenomena:

(a) The radicals formed by irradiation of the frozen solution and maintained immobilized by the low temperature are successively isolated and thus immobilized at the point of formation by the progression of the desiccation front towards the interior of the solid mass. At the end of the operation, they cannot combine owing to the absence of a reactive environment between them, and remain in the radical state.

(b) The radicals which are formed during the activation period in the veins of the frozen solvent and which might be entrained during the sublimation are fixed by adsorption on the large internal surface formed by the dry lyophilic peripheral product. In fact, since the desiccation operates from the free outer surface of the frozen system, a layer of increasing thickness of dry product forms in accordance with the advance of the desiccation front towards the center of the specimen. It exerts a filtering action on the vapors emitted by the specimen itself which acts after the manner of a self adsorbing system. This additional retention of free radicals increases the preceding effect and contributes in the maintenance of the active character of the initial system.

The invention will be further described by way of non-limitative example with reference to the accompanying drawing, by way of experiments in preparing free radicals in stable form.

EXAMPLE 1

A 10% solution of l-lysine in water is distributed at a thickness of 1 cm. into glass flasks and then frozen by cooling with liquid nitrogen. It is then irradiated at 77° K. by a high flux of gamma rays. A dosage of 500,000–2,000,000 rads. is applied during 5–10 hours. The system is then lyophilised at a temperature of −30° C. (243° K.) then the dry product is slowly desorbed at +43° C. and finally sealed hermetically under a very pure nitrogen atmosphere known under the applicant's trade name "Azote R." Analysis by paramagnetic electronic resonance (FIG. 1) shows the existence of stable free radicals at ambient temperature which are totally absent from a non-irradiated system treated in the same manner. However, the quantity is small since the drying was effected at too high a temperature.

EXAMPLE 2

Figure 2:
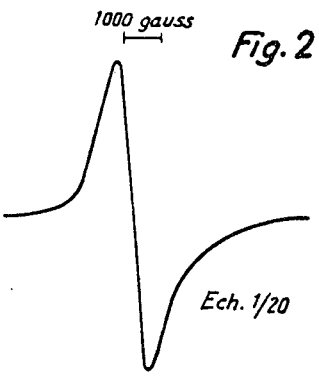

In order to carry out the drying at much lower temperature the same experiment is effected with a 10% l-lysine solution in liquid ammonia. The irradiated system is then lyophilised towards −110° C. (163° K.) and carefully desorbed at +30° C. and sealed under nitrogen R. Analysis by paramagnetic electronic resonance gives a very intensive signal (FIG. 2) which indicates the advantages of carrying out the lyophilization at a very low temperature with a suitable solvent.

The following table gives by way of example the relative intensities of the paramagnetic electronic resonance signal in the preceding experiments. The measures are effected on the X-band at ambient temperature (+20° C.) on the dry final product preserved for eight days at +20° C. under nitrogen.

| System | Irradiation gamma rays, rads. | Lyophilisation temperature, °C. | Paramagnetic electronic resonance signal |
|---|---|---|---|
| l-lysine 10% in $H_2O$ | 0 | −30 | 0 |
| Do | 1,000,000 | −30 | 2,000 |
| l-lysine 10% in $NH_3$ | 1,000,000 | −120 | 6,000,000 |

Figure 3:
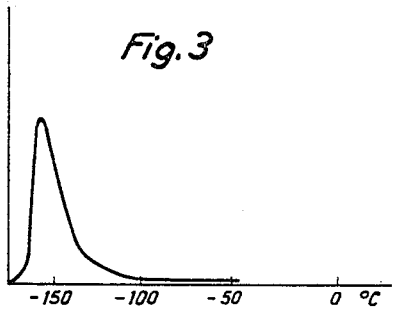
Figure 4:
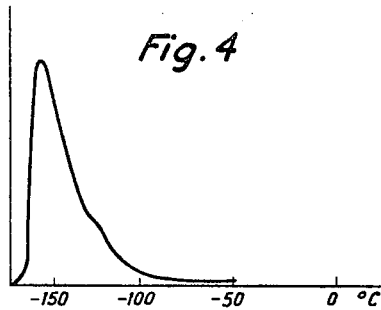

These results are easily interpreted by considering the thermoluminescence curves for the two preceding systems (FIGS. 3 and 4) which indicate a powerful spontaneous deactivation from −172° C. to −94° C.

EXAMPLE 3

The method may also be used equally well for preparing one or the other kind of free radical by effecting a radical selection by means of a suitable thermal treatment. In this case, after activation a controlled heating is effected up to a certain temperature in order to eliminate those radicals which tend to combine under this temperature. Then the remaining radicals are fixed by lyophilisation.

Figure 5:
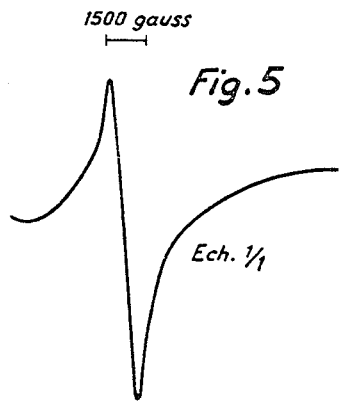
Figure 6:
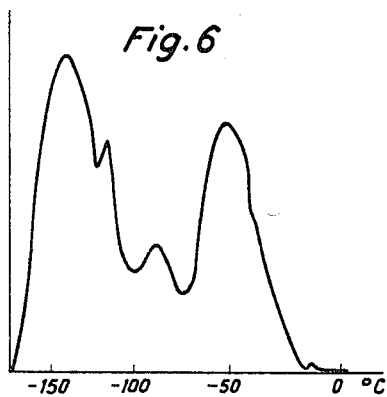

For example, a 0.5% polystyrene solution in benzene is frozen at −196° C. and irradiated at 77° K. by gamma rays (1,000,000 rads.). Then it is heated to −70° C. (203° K.) and lyophilised at this temperature, and finally desorbed at +30° C. and sealed under nitrogen. The analysis shows a powerful paramagnetic electronic resonance signal (FIG. 5) which is without doubt due to the free radicals which have not been deactivated at 203° K. as indicated by the thermoluminescence curve in FIG. 6.

In this particular case, in addition to the radicals formed in the polystyrene there is found in the final product a substantial part of radicals derived from the radiolysis of $C_6H_6$ which are absorbed on the polystyrene during the sublimation. Their nature is not yet known nor is their environment but at any rate they seem to differ considerably from those found usually in benzene irradiated at 141° K. (spectrum with 12 components) or at 220° K. (spectrum with 36 lines).

The preceding examples have merely indicative objects and do in no way limit the invention. The method may be applied to any assembly of solutions, suspensions, emulsions, or to solid systems impregnated by one or more liquids capable of being eliminated by cryodesiccation. Certain of these liquids may be gases under normal temperatures and pressures. In this case, the solutions, suspensions, emulsions or impregnations must be prepared under strictly defined conditions. In this way, solutions in liquid ammonia are generally prepared towards −70°

C. while those in liquid carbon dioxide are effected under pressure.

Amongst the bodies employed as solvents or dispersion or impregnation agents may be named:

(a) inorganic compounds: water, ammonia, carbon dioxide, sulphur anhydride, hydrogen sulphide gas, hydrofluoric, hydrochloric, hydrobromic and hydroiodic acids, hexafluorodisilane, carbon tetrachloride, hydrogen, neon, argon, krypton, and xenon.

(b) organic compounds: dioxane, ether, methylamine, diethylamine, benzene, chloroform, cyclohexane, certain saturated carbons such as 2,2-dimethyl propane, ethylene, acetylene and their main derivaties.

The body obtained at the end of the operation may be reconstituted in its active phase by the addition of a fluid serving to build up a reactive environment. It may also be stabilized by being kept under vacuum or under an inert gas atmosphere (nitrogen, argon, etc.). It is also possible to include it into an inert martix by impregnating it with a neutral liquid which can then be hardened either by cooling (glass) or by polymerizing (resins).

When the term "irradiation" and "irradiating" are used in the claims, the term is meant to include both irradiation and high frequency excitation.

What I claim is:

1. A method for preparing and preserving free radicals in stable form, comprising the steps of
    (a) forming said free radicals by freezing a free radicals-generating substance diluted in a liquid medium of irradiating,
    (b) separating out said frozen liquid medium by selective sublimation at a low temperature at which said free radicals cannot either spontaneously recombine, thereby providing a residual porous mass containing said free radicals; and
    (c) allowably raising the temperature of said residual porous mass to about ambient temperature under the exclusion of air.

2. A method according to claim 1, wherein the selective sublimation is carried out on a sufficiently thick layer of the diluting frozen liquid containing the substance enriched in free radicals to enable the peripheral porous zone formed during the selective sublimation to retain selectively the free radicals which could sublimate from the compact inner zone.

3. A method according to claim 1, wherein the preparation at low temperature of the free radicals in the free radicals-generating substance provides free radicals of different kinds, wherein the step of partial reheating is effected from said low temperature up to a temperature at which only one kind of free radicals remains stable.

4. A method according to claim 3, wherein said partial reheating is carried out prior to the selective sublimation of the diluting medium.

5. A method according to claim 3, wherein said partial reheating is carried out during the selective sublimation of the diluent.

6. A process according to claim 1, wherein a final stabilization of the free radicals is effected by the step of impregnating the residual porous mass containing the free radicals by an inert matrix cast in the liquid state and is then hardened.

7. A method for preparing and preserving free radicals in stable form, comprising diluting in a liquid medium frozen at low temperature said free radicals prepared in a free radical-generating substance by irradiation and carrying away said liquid medium by lyophilization.

References Cited

UNITED STATES PATENTS 3,250,684    5/1966    Bochirol et al. _____ 176—62

OTHER REFERENCES

Phil, Sanner & Henniksen, Acta Chemica Scandinavica, 1963, No. 17, pp. 2124–5.

HOWARD S. WILLIAMS, *Primary Examiner.*

PATENT OFFICE

Washington, D.C. 20231

UNITED STATES PATENT OFFICE
CERTIFICATE OF CORRECTION

Patent No. 3,408,276                          October 29, 1968

Louis Rey

It is certified that error appears in the above identified patent and that said Letters Patent are hereby corrected as shown below:

Column 2, line 29, "$NH_4$" should read -- $NH_4N_3$ --. Column 5, line 13, "derivaties" should read -- derivatives --; line 30, "of" should read -- and --. Column 6, line 28, after "said" insert -- frozen --.

Signed and sealed this 3rd day of March 1970.

(SEAL)
Attest:

Edward M. Fletcher, Jr.
Attesting Officer

WILLIAM E. SCHUYLER, JR.
Commissioner of Patents